Jan. 27, 1942.     A. B. WELTY, JR     2,271,214
SEPARATING HYDROGEN FROM GASEOUS HYDROCARBONS
Filed Feb. 15, 1939
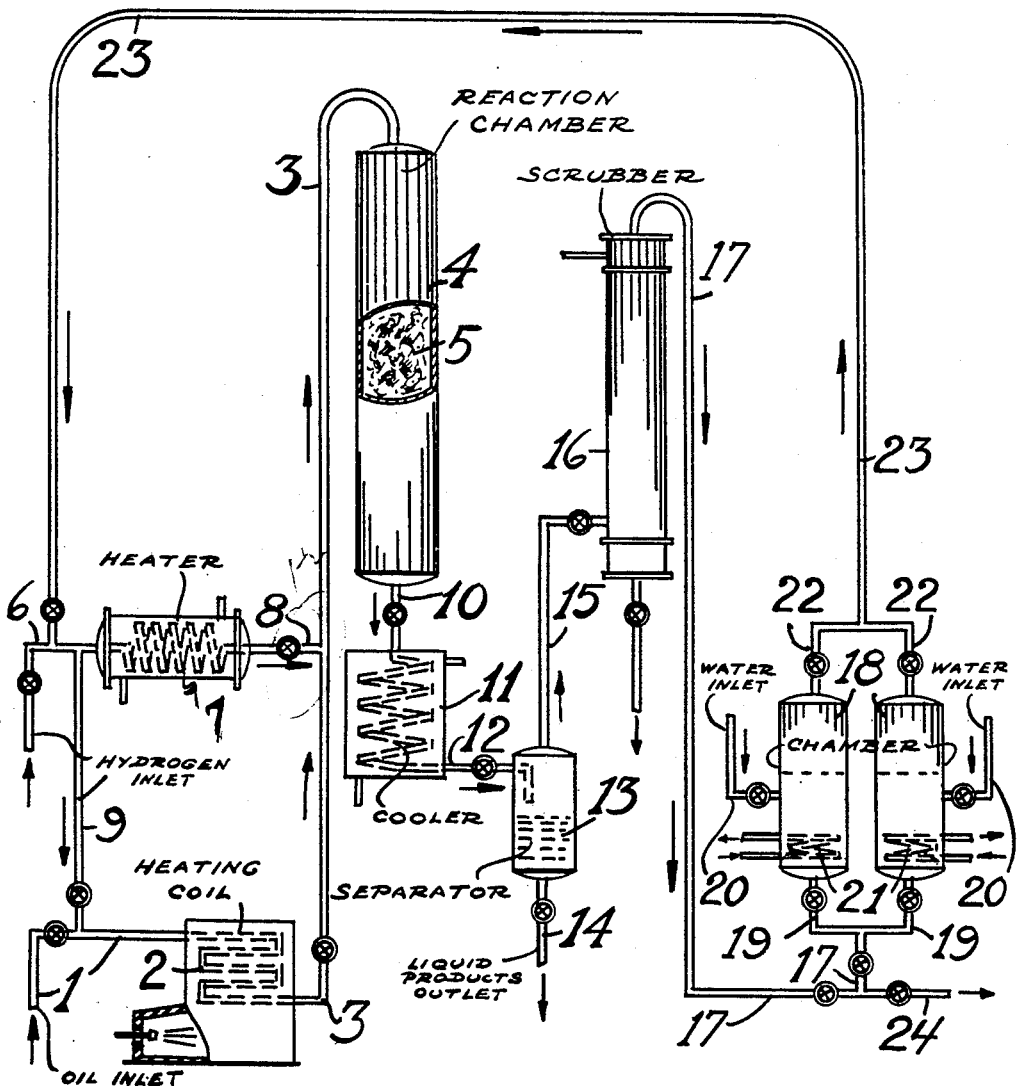
Albert B. Welty, Jr. Inventor
W. F. Weigester Attorney Patented Jan. 27, 1942

2,271,214

UNITED STATES PATENT OFFICE 2,271,214

SEPARATING HYDROGEN FROM GASEOUS HYDROCARBONS

Albert B. Welty, Jr., Elizabeth, N. J., assignor to Standard Oil Development Company, a corporation of Delaware Application February 15, 1939, Serial No. 256,415

4 Claims. (Cl. 23—210)

This invention relates to a method for separating free hydrogen from gaseous hydrocarbons containing the same and is of particular application in increasing the hydrogen content of recycle gases in processes for treating hydrocarbons with hydrogen.

There are many processes for treating hydrocarbon oils and other carbonaceous materials with hydrogen for the purpose of producing lower boiling or more valuable products. Among these may be mentioned destructive hydrogenation in which a carbonaceous material such as coal or a heavy hydrocarbon oil is subjected to the action of hydrogen or gases rich in free hydrogen in quantities between about 3000 and 10,000 cubic feet per barrel of oil under pressures of the order of 20 to 200 or more atmospheres, and at temperatures between 500 and 900° F. while in the presence of a catalytic material such as an oxide or sulfide of a metal of the VI group of the periodic system; hydrofining in which a hydrocarbon oil boiling substantially in the motor fuel range is subjected to the action of hydrogen under pressures between 20 and 200 atmospheres or more, at temperatures between 900 and 1100° F. while in the presence of a catalytic material; hydroforming in which a heavy, viscous hydrocarbon oil is treated with hydrogen under pressures between 20 and 200 atmospheres, at temperatures between 750 and 850° F. and in the presence of strongly hydrogenating catalysts such as molybdenum, chromium or tungsten oxides or sulfides, etc. More recently processes have been proposed in which hydrocarbon oils are subjected to catalytic treatment in the presence of cracking and reforming catalysts such as adsorptive clays, acid activated clays of the bentonitic type, synthetic clays such as alumina or silica mixed or not with other materials such as salts or oxides or sulfides of metals of the VI group of the periodic system, and also in the presence of hydrogen under such conditions of temperature, pressure, partial pressure of hydrogen and space velocity that there is no net consumption of free hydrogen but the presence of hydrogen has a substantial beneficial effect particularly with respect to prolonging substantially the active life of the catalyst and also with respect to increasing the yield and quality of the desired products. This type of catalytic process is carried out at temperatures between 850 and 1050° F., preferably 900 to 1000° F., under pressures between 100 and 1000 pounds per square inch, preferably 200 to 400 pounds per square inch, and in the presence of quantities of hydrogen between 1000 and 6000 cubic feet per barrel of oil, preferably 2000 to 3000 cubic feet per barrel of oil. Space velocities between .1 and 4 volumes of oil per volume of reactor space per hour may be used, but it is preferable to use space velocities between .5 and 1.5 volumes of oil per volume of reactor space per hour. Under these conditions adjusted to the particular feed stock, there is not only no net consumption of free hydrogen but there may in fact be a net production of free hydrogen.

In all of the above mentioned types of processes it is advantageous from a practical and economic point of view to recycle the uncondensable gases evolved in the process because these contain substantial quantities of free hydrogen. A number of processes have been proposed for concentrating the hydrogen in these recycle gases by elimination of the gaseous hydrocarbons.

The present invention is directed to a new and novel process for separating the free hydrogen from gaseous hydrocarbons with which it may be associated in recycle gases evolved in the above referred to types of processes. The nature of this process and the manner in which it may be carried out will be fully understood from the following description read with reference to the accompanying drawing which is a diagrammatic view in sectional elevation of one type of apparatus which may be used.

It has been found that the hydrates of gaseous hydrocarbons may be formed by treating the gaseous hydrocarbons with water or other aqueous media under pressure and at low temperatures. When water is used as the aqueous medium the temperature should be as close to 32° F. as possible although at higher pressures temperatures between 32 and 40° F. may be satisfactory. By exposing a gas containing both hydrogen and hydrocarbons to this treatment, the hydrates of the hydrocarbons are formed and these being solid, the hydrogen can be readily separated therefrom.

Referring to the drawing, numeral 1 designates an inlet line for oil to be treated. The oil passes through a heating means 2 and thence through line 3 into a reactor 4 which contains a catalyst 5. Hydrogen or a gas rich in free hydrogen is introduced through a line 6 and passes thence through a heating means 7 and flows through line 8 which meets line 3 and mixes with the heated oil. Alternately, the hydrogen may be mixed with the oil prior to passing through the heating means by passing through line 9.

The hydrogen and oil are heated to reaction temperature while under reaction pressure and then the mixture passes into the reactor 4, which is maintained under the required reaction conditions.

The products of reaction leave the reaction chamber 4 through line 10, pass into a cooling means 11 and then through line 12 into a separating means 13 wherein the gaseous and liquid products are separated. The liquid products are removed through line 14.

The gaseous products are removed from separating means 13 through line 15 and pass thence through a scrubbing means 16 wherein entrained liquid products and some gaseous hydrocarbons are removed by scrubbing with a hydrocarbon oil or other suitable agent. The scrubbing gas still under reaction pressure leaves the scrubbing means through line 17 and passes thence through line 19 into one or more chambers 18 wherein the hydrates of the hydrocarbon constituents of the gas will be formed. In the drawing only two chambers are shown but it will be understood that as many as necessary may be used.

Water cooled to a temperature close to 32° F., at any rate not above 40° F., is introduced into chambers 18 through lines 20. The water is preferably saturated with the hydrocarbon constituents of the gases prior to use. Of course, after the process has been in operation some time the water will become saturated with the hydrocarbons and remain saturated. The water may be kept at the required temperature close to 32° F. by means of cooling coils 21 or any other suitable means.

As the gases rise through the water maintained at close to 32° F. and under full reaction pressure, the hydrates of the hydrocarbons form. These are solid crystalline substances and remain dissolved or suspended in the water. The hydrogen passes through unaffected and is removed through lines 22 and may be returned to the process through line 23. From time to time the flow of gases may be stopped and the accumulated hydrocarbon hydrates may be decomposed by warming the water slightly and the hydrocarbon gases may then be removed through lines 19, 17 and 24.

In the operation of the hydrocarbon hydrate step, it is desirable to use a relatively small quantity of water in comparison with the volume of gases. For purposes of illustration, however, the chambers 18 have been shown disproportionately large. The actual quantity of water used will be very small in relation to the volume of gas, say about 100 cc. per cubic foot of gas.

It will be understood that the formation of the hydrocarbon hydrates may be accomplished in other ways than that illustrated. For example, the water saturated with hydrocarbons may be contacted with the gases in the form of a fine spray, or the gases and water may be contacted in other ways to accomplish thorough mixing of the water and gaseous hydrocarbons.

Although in the description water has been referred to as the aqueous medium, it should be understood that other aqueous media may be used. For example, water solutions of salts such as sodium, calcium or potassium chlorides, sulfates or nitrates, water solutions of alcohols such as ethyl, isopropyl and butyl alcohols, water solutions of glycerine or ethylene glycol may be used. In such cases the freezing point of the solution may be well below 32° F. and therefore the temperature at which the formation of the hydrates occurs may be well below 32° F., in fact at any point above the freezing point of the particular solution or aqueous medium selected.

This invention is not limited by any theories of the mechanism of the reaction nor by any details which have been given merely for purposes of illustration but is limited only in and by the following claims in which it is intended to claim all novelty inherent in the invention.

I claim:

1. Process for increasing the concentration of free hydrogen in a gas comprising substantial quantities of free hydrogen and hydrocarbons of one to three carbon atoms which comprises exposing said gas to the action of water under superatmospheric pressure and at a low temperature above the freezing point of water under conditions such that solid hydrates of the hydrocarbons may form, and then separating the remaining gas from the solid hydrates.

2. Process for increasing the concentration of free hydrogen in a gas comprising substantial quantities of free hydrogen and hydrocarbons of one to three carbon atoms which comprises exposing said gas to the action of water under a pressure in excess of 100 pounds per square inch and at a temperature close to but above 32° F. under conditions such that solid hydrates of the hydrocarbons may form, and then separating the remaining gas from the solid hydrates so formed.

3. Process for increasing the concentration of free hydrogen in a gas obtained in the treatment of hydrocarbon oils with hydrogen under pressures in excess of 100 pounds per square inch, said gas comprising substantial quantities of free hydrogen and hydrocarbons of one to three carbon atoms, which comprises exposing said gas to the action of water under substantially the same pressure as that under which the gas was obtained and at a temperature close to but above 32° F., adjusting the temperature, pressure and quantity of water with relation to each other so that solid hydrates of the hydrocarbons may form, and then separating the remaining gas from the solid hydrates so formed.

4. Process for increasing the concentration of free hydrogen in a gas comprising substantial quantities of free hydrogen and hydrocarbons of one to three carbon atoms which comprises exposing said gas to the action of water in quantities of about 100 cubic centimeters of water per cubic foot of gas under superatmospheric pressure and at a low temperature above 32° F., adjusting the temperature and pressure with relation to the quantity of water and the composition of the gas so that solid hydrates of the hydrocarbons may form, and then separating the remaining gas from the solid hydrates so formed.

ALBERT B. WELTY, Jr.